(12) United States Patent
Herken et al.

(10) Patent No.: US 7,616,198 B2
(45) Date of Patent: *Nov. 10, 2009

(54) SYSTEM AND COMPUTER-IMPLEMENTED METHOD FOR MODELING THE THREE-DIMENSIONAL SHAPE OF AN OBJECT BY SHADING OF A TWO-DIMENSIONAL IMAGE OF THE OBJECT

(75) Inventors: Rolf Herken, Berlin (DE); Tom-Michael Thamm, Berlin (DE)

(73) Assignee: Mental Images GmbH, Berlin (DE)

( * ) Notice: Subject to any disclaimer, the term of this patent is extended or adjusted under 35 U.S.C. 154(b) by 622 days.

This patent is subject to a terminal disclaimer.

(21) Appl. No.: 10/795,704

(22) Filed: Mar. 5, 2004

(65) Prior Publication Data

US 2004/0169652 A1 Sep. 2, 2004

(51) Int. Cl.
*G06T 15/00* (2006.01)
*G06T 17/00* (2006.01)
*G06T 15/50* (2006.01)
*G06T 15/60* (2006.01)

(52) U.S. Cl. .................. 345/419; 345/420; 345/426

(58) Field of Classification Search .......... 345/426, 345/420, 423, 629; 382/130–132
See application file for complete search history.

(56) References Cited

U.S. PATENT DOCUMENTS 4,695,966 A * 9/1987 Takakura et al. ............ 345/536

(Continued)

FOREIGN PATENT DOCUMENTS

| JP | 02-129770 | 5/1990 |
| JP | 07-152929 | 6/1995 |
| JP | 08-123835 | 5/1996 |

OTHER PUBLICATIONS

Hanson et al., "Visualizing the fourth dimension using geometry and light", Proc. of 2nd Conference on Visualization '91, Oct. 22-25, 1991, G. M. Nielson and L. Rosenblum, Eds., IEEE Visualization, IEEE Computer Society Press, pp. 321-328.*

(Continued)

*Primary Examiner*—Ulka Chauhan
*Assistant Examiner*—Roberta Prendergast
(74) *Attorney, Agent, or Firm*—Jacobs & Kim LLP; David Jacobs

(57) ABSTRACT

A computer graphics system generates a three-dimensional model of an object in an interactive manner under control of an operator. An initial model for the object to be modeled is displayed to the operator as illuminated from a particular illumination direction and projected onto an image plane. The operator can update shading of a pixel on the image plane, and, based on the updated shading, the computer graphics system generates an updated normal vector for the updated pixel, which identifies the normal of the surface of the object projected onto the updated pixel. Using the updated normal vector field and a height field, which represents the height of the respective portion of the object as projected onto the respective pixels of the image plane, the computer graphics system generates an updated height value for the updated pixel, thereby to update the height field. The updated normal vector field and the updated height field define the updated model of the object, which corresponds to the updated shape of the object as updated based on the updated shading. The computer graphics system can then display to the operator an image of the object as defined by the updated model. If the updated model is satisfactory, the computer graphics system saves the updated model as the final model. On the other hand, if the updated model is not satisfactory, the operator can further update the shading and enable the computer graphics system to generate a further updated normal vector field and updated height field, thereby to generate a further updated model for the object. The operations can be repeated until the operator determines that the object is satisfactory.

16 Claims, 8 Drawing Sheets

U.S. PATENT DOCUMENTS

| | | | | |
|---|---|---|---|---|
| 4,752,773 A * | 6/1988 | Togawa et al. | | 345/156 |
| 4,800,539 A * | 1/1989 | Corn et al. | | 367/72 |
| 4,888,713 A * | 12/1989 | Falk | | 345/582 |
| 4,949,279 A * | 8/1990 | Takakura et al. | | 345/418 |
| 4,964,066 A * | 10/1990 | Yamane et al. | | 345/441 |
| 4,999,789 A * | 3/1991 | Fiasconaro | | 345/427 |
| 5,022,091 A * | 6/1991 | Carlson | | 382/240 |
| 5,226,115 A * | 7/1993 | Fiasconaro | | 345/441 |
| 5,243,694 A * | 9/1993 | Fiasconaro | | 345/441 |
| 5,255,352 A * | 10/1993 | Falk | | 345/582 |
| 5,283,860 A * | 2/1994 | Einkauf et al. | | 345/624 |
| 5,293,471 A * | 3/1994 | Ikeuchi et al. | | 345/443 |
| 5,295,199 A * | 3/1994 | Shino | | 345/581 |
| 5,299,302 A * | 3/1994 | Fiasconaro | | 345/442 |
| 5,303,386 A * | 4/1994 | Fiasconaro | | 345/419 |
| 5,307,449 A * | 4/1994 | Kelley et al. | | 345/419 |
| 5,325,110 A * | 6/1994 | Tang et al. | | 345/157 |
| 5,333,245 A * | 7/1994 | Vecchione | | 345/582 |
| 5,369,736 A * | 11/1994 | Kato et al. | | 345/582 |
| 5,377,313 A * | 12/1994 | Scheibl | | 345/422 |
| 5,457,754 A * | 10/1995 | Han et al. | | 382/128 |
| 5,471,566 A * | 11/1995 | Kirk | | 345/426 |
| 5,483,626 A * | 1/1996 | Nakayama | | 345/645 |
| 5,499,323 A * | 3/1996 | Doi et al. | | 345/426 |
| 5,509,114 A * | 4/1996 | Moran et al. | | 345/443 |
| 5,579,444 A * | 11/1996 | Dalziel et al. | | 700/259 |
| 5,590,257 A * | 12/1996 | Forcier | | 715/530 |
| 5,598,182 A * | 1/1997 | Berend et al. | | 345/619 |
| 5,611,036 A * | 3/1997 | Berend et al. | | 345/441 |
| 5,621,824 A * | 4/1997 | Ijiri et al. | | 382/274 |
| 5,629,722 A * | 5/1997 | Oh | | 345/467 |
| 5,654,529 A * | 8/1997 | Yeung et al. | | 178/19.03 |
| 5,673,375 A * | 9/1997 | Horii | | 345/426 |
| 5,680,525 A * | 10/1997 | Sakai et al. | | 345/585 |
| 5,687,259 A * | 11/1997 | Linford | | 382/294 |
| 5,734,383 A * | 3/1998 | Akimichi | | 345/420 |
| 5,739,820 A * | 4/1998 | Lyon | | 345/426 |
| 5,748,199 A * | 5/1998 | Palm | | 345/473 |
| 5,757,380 A * | 5/1998 | Bardon et al. | | 345/629 |
| 5,793,374 A * | 8/1998 | Guenter et al. | | 345/426 |
| 5,794,104 A * | 8/1998 | Maruyama | | 399/183 |
| 5,796,428 A * | 8/1998 | Matsumoto et al. | | 348/207.99 |
| 5,887,082 A * | 3/1999 | Mitsunaga et al. | | 382/199 |
| 5,892,509 A * | 4/1999 | Jakobs et al. | | 715/751 |
| 5,892,853 A * | 4/1999 | Hirani et al. | | 382/280 |
| 5,936,628 A * | 8/1999 | Kitamura et al. | | 345/420 |
| 5,982,381 A * | 11/1999 | Joshi et al. | | 345/629 |
| 5,990,900 A * | 11/1999 | Seago | | 345/427 |
| 5,990,901 A * | 11/1999 | Lawton et al. | | 345/581 |
| 6,005,636 A * | 12/1999 | Westerman | | 348/571 |
| 6,040,835 A * | 3/2000 | Gibson | | 345/424 |
| 6,473,083 B1 * | 10/2002 | Suzuki et al. | | 345/426 |

OTHER PUBLICATIONS

Sato et al., "Object shape and reflectance modeling from observation", Proc. of 24th Annual Conference on Computer Graphics and Interactive Techniques, ACM Press/Addison-Wesley Publishing Co., New York, NY, pp. 379-387.*

Lengagne et al., "From 2D images to 3D face geometry", Proceed. of Second International Conference on Automatic Face and Gesture Recognition, Oct. 1996, pp. 301-306.*

Jiang Yu Zheng et al., "Computing 3D models of rotating objects from moving shading", Proceedings of the 13th International Conference on Pattern Recognition, vol. 1, Aug. 1996, pp. 800-804.*

Jiang Yu Zheng et al., "3D surface estimation and model construction from specular motion in image sequences", IEEE Transactions Pattern Analysis and Machine Intelligence, vol. 19, Issue 5, May 1997, pp. 513-520.*

Jiang Yu Zheng et al., "Shape and model from specular motion", Proc. Fifth International Conference Computer Vision, Jun. 1995, pp. 72-79.*

Jiang Yu Zheng et al., "Acquiring 3D models from rotation and highlights", Proceedings of the 12th IAPR International Conference on Pattern Recognition, 1994. vol. 1—Conference A: Computer Vision & Image Processing, vol. 1, Oct. 1994, pp. 331-336.*

Jiang Yu Zheng, "Constructing a 3D object model from multiple visual features", IEEE International Conference on Systems, Man, and Cybernetics, vol. 4, Oct. 1996, pp. 2457-2462.*

Cryer, J.E.; Tsai, P.-S.; Shah, M.; "Integration of shape from X modules: combining stereo and shading", Proceedings IEEE Computer Society Conference on Computer Vision and Pattern Recognition, Jun. 15-17, 1993, pp. 720-721.*

Ron, G.; Peleg, S.; "Multiresolution shape from shading", Proceedings IEEE Computer Society Conference on Computer Vision and Pattern Recognition, 1989, Jun. 4-8, 1989, pp. 350-355.*

Guo-Qin Wei; Hirzinger, G.; "Learning shape from shading by a multilayer network", IEEE Transactions on Neural Networks, vol. 7, Issue 4, Jul. 1996, pp. 985-995.*

Malladi, R.; Sethian, J.A.; "Level set and fast marching methods in image processing and computer vision", Proceedings International Conference on Image Processing, vol. 1, Sep. 16-19, 1996, pp. 489-492.*

Ahmed, M.; Yamany, S.; Hemayed, E.; Ahmed, S.; Roberts, S.; Farag, A.; "3D reconstruction of the human jaw from a sequence of images", Proceedings 1997 IEEE Computer Society Conference on Computer Vision and Pattern Recognition, Jun. 17-19, 1997, pp. 646-653.*

Frankot, R.T.; Chellappa, R.; "A method for enforcing integrability in shape from shading algorithms", IEEE Transactions on Pattern Analysis and Machine Intelligence, vol. 10, Issue 4, Jul. 1988, pp. 439-451.*

Chen-Kai Huang; Chuang Pal; Wen-Thong Chang; "Shape from shading using Ritz method with tent basis", Proceedings of the 13th International Conference on Pattern Recognition, 1996, vol. 1, Aug. 25-29, 1996, pp. 398-402.*

Tae-Eun Kim; Sun-Ho Lee; Seok-Hyun Ryu; Jong-Soo Choi; "Shape reconstruction using extended photometric stereo", Proceedings of 1997 International Conference on Information, Communications and Signal Processing, ICICS, Sep. 9-12, 1997, pp. 718-720, vol. 2.*

Shah, J.; Pien, H.H.; Gauch, J.M.; "Recovery of surfaces with discontinuities by fusing shading and range data within a variational framework", IEEE Transactions on Image Processing, vol. 5, Issue 8, Aug. 1996, pp. 1243-1251.*

Stewart, A.J.; Langer, M.S.; "Towards accurate recovery of shape from shading under diffuse lighting", Proceedings CVPR '96 1996 IEEE Computer Society Conference on Computer Vision and Pattern Recognition, Jun. 18-20, 1996, pp. 411-418.*

Ying-li Tian; Tsui, H.T.; "Shape from shading for non-Lambertian surfaces from one color image", Proceedings of the 13th International Conference on Pattern Recognition, vol. 1, Aug. 25-29, 1996, pp. 258-262.*

Zheng, Q.; Chellappa, R.; "Estimation of surface topography from stereo SAR images", 1989 International Conference on Acoustics, Speech, and Signal Processing, ICASSP-89, May 23-26, 1989, pp. 1614-1617.*

Zheng, Q.; Chellappa, R.; "Estimation of illuminant direction, albedo, and shape from shading", IEEE Transactions on Pattern Analysis and Machine Intelligence, vol. 13, Issue 7, Jul. 1991, pp. 680-702.*

Sato et al., "Object shape and reflectance modeling from observation", Proc. of 24th Annual Conference on Computer Graphics and Interactive Techniques, Aug. 1997, ACM Press/Addison-Wesley Publishing Co., New York, NY, pp. 379-387.*

"The Tracking Cube", IBM Technical Disclosure Bulletin, vol. 32, No. 3B, pp. 91-95, Aug. 1989.

* cited by examiner

SYSTEM AND COMPUTER-IMPLEMENTED METHOD FOR MODELING THE THREE-DIMENSIONAL SHAPE OF AN OBJECT BY SHADING OF A TWO-DIMENSIONAL IMAGE OF THE OBJECT

INCORPORATION BY REFERENCE

"This application for U.S. patent (Ser. No. 10/795,704 filed Mar. 5, 2004) is a Divisional of U.S. patent application Ser. No. 09/027,175 filed Feb. 20, 1998 (issued as U.S. Pat. No. 6,724,383 on Apr. 20, 2004), which claims the priority benefit of U.S. Provisional Patent App. 60/038,888 filed Feb. 21, 1997, each incorporated herein by reference."

"The Shape-By-Shading Modeler," a paper by Rolf Herken and Tom-Michael Thamm, attached hereto as an appendix and incorporated herein by reference.

FIELD OF THE INVENTION

The invention relates generally to the field of computer graphics, computer-aided geometric design and the like, and more particularly to generating a three-dimensional model of an object.

BACKGROUND OF THE INVENTION

In computer graphics, computer-aided geometric design and the like, an artist, draftsman or the like (generally referred to herein as an "operator") attempts to generate a three-dimensional model of an object, as maintained by a computer, from lines defining two-dimensional views of objects. Conventionally, computer-graphical arrangements generate a three-dimensional model from, for example, various two-dimensional line drawings comprising contours and/or cross-sections of the object and by applying a number of operations to such lines which will result in two-dimensional surfaces in three-dimensional space, and subsequent modification of parameters and control points of such surfaces to correct or otherwise modify the shape of the resulting model of the object. After a three-dimensional model for the object has been generated, it may be viewed or displayed in any of a number of orientations.

In a field of artificial intelligence commonly referred to as robot vision or machine vision (which will generally be referred to herein as "machine vision"), a methodology referred to as "shape from shading" is used to generate a three-dimensional model of an existing object from one or more two-dimensional images of the object as recorded by a camera. Generally, in machine vision, the type of the object recorded on the image(s) is initially unknown by the machine, and the model of the object that is generated is generally used to, for example, facilitate identification of the type of the object depicted on the image(s) by the machine or another device.

In the shape from shading methodology, the object to be modeled is illuminated by a light source, and a camera, such as a photographic or video camera, is used to record the image(s) from which the object will be modeled. It is assumed that the orientation of a light source, the camera position and the image plane relative to the object are known. In addition, it is assumed that the reflectance properties of the surface of the object are also known. It is further assumed that an orthographic projection technique is used to project the surface of the object onto the image plane, that is, it is assumed that an implicit camera that is recording the image on the image plane has a focal length of infinity. The image plane represents the x,y coordinate axes (that is, any point on the image plane can be identified by coordinates (x,y)), and the z axis is thus normal to the image plane; as a result, any point on the surface of the object that can be projected onto the image plane can be represented by the coordinates (x,y,z). The image of the object as projected onto the image plane is represented by an image irradiance function $I(x,y)$ over a two-dimensional domain $\Omega \subset \mathbb{R}^2$, while the shape of the object is given by a height function $z(x,y)$ over the domain $\Omega$. The image irradiance function $I(x,y)$ represents the brightness of the object at each point (x,y) in the image. In the shape from shading methodology, given $I(x,y)$ for all points (x,y) in the domain, the shape of an object, given by $z(x,y)$, is determined.

In determining the shape of an object using the shape from shading methodology, several assumptions are made, namely,
  (i) the direction of the light source is known;
  (ii) the shape of the object is continuous;
  (iii) the reflectance properties of the surface of the object are homogenous and known; and
  (iv) the illumination over at least the portion of the surface visible in the image plane is uniform.

Under these assumptions, the image irradiance function $I(x,y)$ for each point (x,y) on the image plane can be determined as follows. First, changes in surface orientation of the object is given by means of first partial derivatives of the height function $z(x,y)$ with respect to both x and y, $$p(x,y) = \frac{\partial z(x,y)}{\partial x} \text{ and } q(x,y) = \frac{\partial z(x,y)}{\partial y}, \tag{1}$$

where p-q space is referred to as the "gradient space." Every point (p,q) of the gradient space corresponds to a particular value for the surface gradient. If the surface is continuous, values for p and q are dependent on each other since the cross-partial-derivatives have to be equal, that is:

$$\frac{\partial p(x,y)}{\partial y} = \frac{\partial q(x,y)}{\partial x}. \tag{2}$$

(Equation (2) holds if the surface is continuous because each partial derivative represents the second partial derivative of the height function $z(x,y)$ with respect to both x and y, and x and y are independent.) Equation (2) is referred to as the "integrability constraint," which, if it holds, will ensure that the surface is smooth and satisfies equation (1).

The relationship between the image irradiance function $I(x,y)$ and the surface orientation (p,q) is given by a function $R(p,q)$, which is referred to as a reflectance map $$I(x,y)=R(p(x,y),q(x,y)) \tag{3}.$$

Equation (3) is referred to as the "image irradiance equation." As an example, a relatively simple reflectance map exists for objects which have a Lambertian surface. A Lambertian surface appears to be equally bright from all viewing directions, with the brightness being proportional to the light flux incident on the surface. The reflection $R_L(p,q)$ is proportional to the cosine of the angle $\alpha$ between a direction that is normal to the surface, which is represented by the vector $\vec{x}$ and the incident light ray direction, which is represented by the vector $\vec{L}$, that is, $$R_L(p,q)=\cos \alpha = \vec{n} \cdot \vec{L} \tag{4},$$

where $\vec{n} =(p,q,1)$, given through $p(x,y), q(x,y)$ and $\vec{L}=(x_L, y_L, z_L)$ gives the direction of the light source.

Typically, shape from shading is performed in two steps. First, the partial derivatives p and q of the height function $z(x,y)$ are determined to get the normal information $\vec{n}$ and in the second step the height $z(x,y)$ is reconstructed from p and q. The partial derivatives p an q can be determined by solving the system of equations consisting of the image irradiance equation (3) and the integrability constraint equation (2). Since images can be noisy and the assumptions noted above are sometimes not perfectly satisfied, there may be no solution using this methodology, and in any case there will be no unique solution.

SUMMARY OF THE INVENTION

The invention provides a new and improved system and method for generating a three-dimensional model of an object by shading as applied by an operator or the like to a two-dimensional image of the object in the given state of its creation at any point in time.

In brief summary, the invention provides a computer graphics system for facilitating the generation of a three-dimensional model of an object in an interactive manner with an operator, such as an artist or the like. Generally, the operator will have a mental image of the object whose model is to be generated, and the operator will co-operate with the computer graphics system to develop the model. The computer graphics system will display one or more images of the object as currently modeled from rotational orientations, translational positions, and scaling or zoom settings as selected by the operator, and the operator can determine whether the object corresponds to the mental image.

In the model generation process, an initial model for the object is initialized and an image thereof is displayed to the operator by the computer graphics system. The image that is displayed will reflect a particular position of a light source and camera relative to the object, the position of the light source relative to the object defining an illumination direction, and the position of the camera relative to the object defining an image plane onto which the image of the object is projected. Any initial model, defining at least an infinitesimally small fragment of the surface for the object to be modeled, can be used, preferably occupying at least one pixel of the image plane. The initial model will identify, for the point or points on the image plane onto which the image of the surface fragment is projected, respective height values for the surface fragment defining the distance from the image plane for the surface fragment at that (those) point(s). The collection of height value(s) for the respective points on the image plane comprise a height field which defines the initial model for the object.

The initial model used in the model generation process may be one of a plurality of default models as provided by the computer graphics system itself, such as a model defining a hemi-spherical or -ellipsoid shape. Alternatively, the initial model may be provided by the operator by providing an initial shading of at least one pixel of the image plane, through an operator input device provided by the computer graphics system. If the initial model is provided by the operator, one of the points, or pixels, on the image plane is preferably selected to provide a "reference" portion of the initial surface fragment for the object, the reference initial surface fragment portion having a selected spatial position, rotational orientation, and height value with respect to the image plane, and the computer graphics system determines the initial model for the rest of the surface fragment (if any) in relation to shading (if any) applied to other pixels on the image plane. In one embodiment, the reference initial surface fragment portion is selected to be the portion of the surface fragment for which the first point or pixel to which the operator applies shading. In addition, in that embodiment, the reference initial surface fragment portion is determined to be parallel to the image plane, so that a vector normal thereto is orthogonal to the image plane and it has a selected height value. In any case, computer graphics system will display the image of the initial model, the image defining the shading of the object associated with the initial model as illuminated from the particular illumination direction and projected onto the image plane.

After the initial model has been developed and the image for the object associated with the initial model as projected onto the image plane has been displayed, the operator can update the shading of the image on the image plane, using, for example, a conventional pressure sensitive pen and digitizing tablet. In updating the shading, the operator can increase or reduce the shading at particular points in the image, thereby to control the brightness, or intensity values, of the image at those points. In addition, the operator can add to the surface fragment by providing shading at points on the image plane proximate those points onto which the surface fragment is currently projected. Furthermore, in an erasing mode of the shading operation, the operator can remove portions of the surface fragment by, for example, marking as unshaded the particular points on the image plane onto which the portions of the surface fragment that are to be removed are projected. After the shading of a point of the image plane has been updated, if the point is not marked as being unshaded, the computer graphics system will use the updated shading to generate an updated normal vector which identifies, for that point, the normal vector of portion of the surface of the object as projected onto the respective point, and, using the updated normal vector field and the height field, will generate an updated height field for the object. The updated normal vector field and the updated height field define the updated model of the object, which corresponds to the updated shape of the object as updated based on the shading provided by the operator.

After generating the updated model of the object, the computer graphics system can display an image of the object, as defined by the updated model, to the operator. If the updated model is satisfactory, the computer graphics system can save the updated model as the final model. On the other hand, if the updated model is not satisfactory, the operator can update the shading further. thereby to enable the computer graphics system to generate a further updated normal vector field and updated height field, thereby to generate a further updated model for the object. The computer graphics system and operator can repeat these operations until the operator determines that the object is satisfactory.

A computer graphics system constructed in accordance with the invention avoids the necessity of solving partial differential equations, which is required in prior art systems which operate in accordance with the shape-from-shading methodology.

Embodiments of the invention also allow the operator to perform conventional computer graphics operations in connection with the object, including rotation and spatial translation of the object to facilitate projection of an image of the object onto an image plane from any of a number of rotational orientations and spatial positions, and scaling or zooming to facilitate enlargement or reduction of the object and/or the image. In such embodiments, the operator can update the shading of the image from any particular three-dimensional rotational and/or translational orientation and position, and from the scaling or zoom setting, as selected by the operator.

In addition, embodiments of the invention allow the operator to trim any surface fragment at any moment in time or the updated final object, which may consist of a plurality of such surface fragments, in a conventional manner by projecting two-dimensional trim curves onto the surface of the object. The operator can use the input device, operating in an appropriate drawing mode, to draw these trim curves on the image plane.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
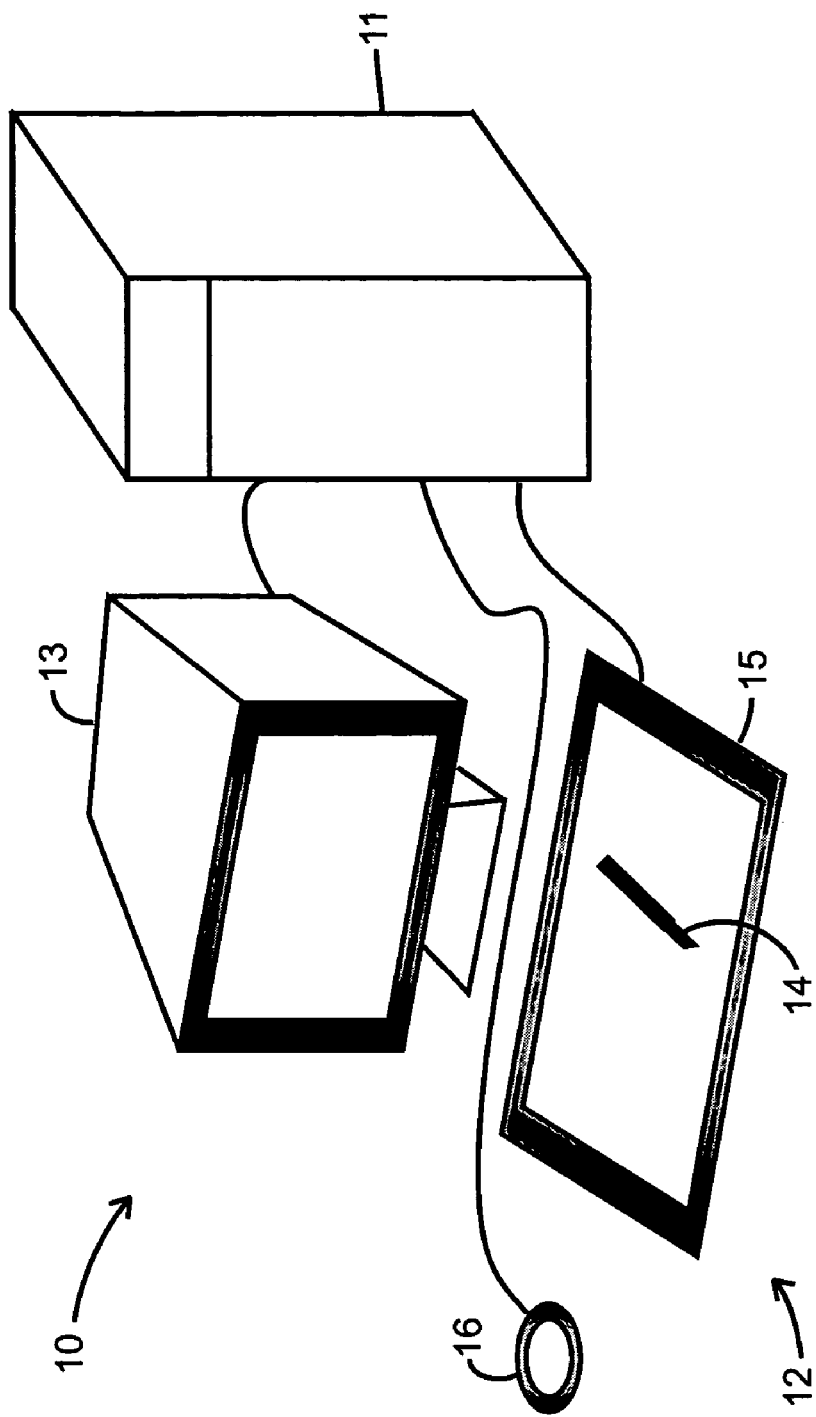
FIG. 1 depicts a computer graphics system for generating a three-dimensional model of an object by shading as applied by an operator or the like to a two-dimensional image of the object in the given state of its creation at any point in time, constructed in accordance with the invention.

FIG. 1 depicts a computer graphics system 10 for generating a three-dimensional model of an object by shading as applied by an operator or the like to a two-dimensional image of the object in the given state of its creation at any point in time, constructed in accordance with the invention. With reference to FIG. 1, the computer graphics system includes a processor module 11, one or more operator input devices 12 and one or more display devices 13. The display device(s) 13 will typically comprise a frame buffer, video display terminal or the like, which will display information in textual and/or graphical form on a display screen to the operator. The operator input devices 12 for a computer graphics system 10 will typically include a pen 14 which is typically used in conjunction with a digitizing tablet 15, and a trackball or mouse device 16. Generally, the pen 14 and digitizing tablet will be used by the operator in several modes. In one mode, particularly useful in connection with the invention, the pen 14 and digitizing tablet are used to provide updated shading information to the computer graphics system. In other modes, the pen and digitizing tablet are used by the operator to input conventional computer graphics information, such as line drawing for, for example, surface trimming and other information, to the computer graphics system 10, thereby to enable the system 10 to perform conventional computer graphics operations. The trackball or mouse device 16 can be used to move a cursor or pointer over the screen to particular points in the image at which the operator can provide input with the pen and digitizing tablet. The computer graphics system 10 may also include a keyboard (not shown) which the operator can use to provide textual input to the system 10.

The processor module 11 generally includes a processor, which may be in the form of one or more microprocessors, a main memory, and will generally include one a mass storage subsystem including one or more disk storage devices. The memory and disk storage devices will generally store data and programs (collectively, "information") to be processed by the processor, and will store processed data which has been generated by the processor. The processor module includes connections to the operator input device(s) 12 and the display device(s) 13, and will receive information input by the operator through the operator input device(s) 12, process the input information, store the processed information in the memory and/or mass storage subsystem. In addition, the processor module can provide video display information, which can form part of the information obtained from the memory and disk storage device as well as processed data generated thereby, to the display device(s) for display to the operator. The processor module 11 may also include connections (not shown) to hardcopy output devices such as printers for facilitating the generation of hardcopy output, modems and/or network interfaces (also not shown) for connecting the system 10 to the public telephony system and/or in a computer network for facilitating the transfer of information, and the like.

The computer graphics system 10 generates from input provided by the operator, through the pen and digitizing tablet and the mouse, information defining the initial and subsequent shape of a three-dimensional object, which information may be used to generate a two-dimensional image of the corresponding object for display to the operator, thereby to generate a model of the object. The image displayed by the computer graphics system 10 represents the image of the object as illuminated from an illumination direction and as projected onto an image plane, with the object having a spatial position and rotational orientation relative to the illumination direction and the image plane and a scaling and/or zoom setting as selected by the operator. The initial model used in the model generation process may be one of a plurality of default models as provided the computer graphics system itself, such as a model defining a hemi-spherical or -ellipsoid shape. Alternatively, the initial model may be provided by the operator by providing an initial shading of at least one pixel of the image plane, using the pen 14 and digitizing tablet 15. If the initial model is provided by the operator, one of the pixels on the image plane is selected to provide a "reference" portion of the initial surface fragment for the object, the reference initial surface fragment portion having a selected spatial position, rotational orientation and height value with respect to the image plane, and the computer graphics system determines the initial model for the rest of the surface fragment (if any) in relation to shading (if any) applied to other pixels on the image plane. In one embodiment, the reference initial surface fragment portion is selected to be the portion of the surface fragment for which the first pixel on the image plane to which the operator applies shading. In addition, in that embodiment, the reference initial surface fragment portion is determined to be parallel to the image plane, so that a vector normal to the reference initial surface fragment portion is orthogonal to the image plane and the reference initial surface fragment portion has a height value as selected by the operator. In any case, computer graphics system will display the image of the initial model, the image defining the shading of the object associated with the initial model as illuminated from the particular illumination direction and projected onto the image plane.

The operator, using the mouse and the pen and digitizing tablet, will provide updated shading of the image of the initial object, and/or extend the object by shading neighboring areas on the image plane, and the computer graphics system 10 will generate an updated model representing the shape of the object based on the updated shading provided by the operator. In updating the shading, the operator can increase or decrease the amount of shading applied to particular points on the image plane. In addition, the operator, using the mouse or trackball and the pen and digitizing tablet, can perform conventional computer graphics operations in connection with the image, such as trimming of the surface representation of the object defined by the model. The computer graphics system 10 can use the updated shading and other computer graphic information provided by the operator to generate the updated model defining the shape of the object, and further generate from the updated model a two-dimensional image for display to the operator, from respective spatial position(s), rotational orientation(s) and scaling and/or zoom settings as selected by the operator. If the operator determines that the shape of the object as represented by the updated model is satisfactory, he or she can enable the computer graphics system 10 to store the updated model as defining the shape of the final object. On the other hand, if the operator determines that the shape of the object as represented by the updated model is not satisfactory, he or she can cooperate with the computer graphics system 10 to further update the shading and other computer graphic information, in the process using three-dimensional rotation and translation and scaling or zooming as needed. As the shading and other computer graphic information is updated, the computer graphics system 10 updates the model information, which is again used to provide a two-dimensional image of the object, from rotational orientations, translation or spatial position settings, and scale and/or zoom settings as selected by the operator. These operations can continue until the operator determines that the shape of the object is satisfactory, at which point the computer graphics system 10 will store the updated model information as representing the final object.

Figure 2:
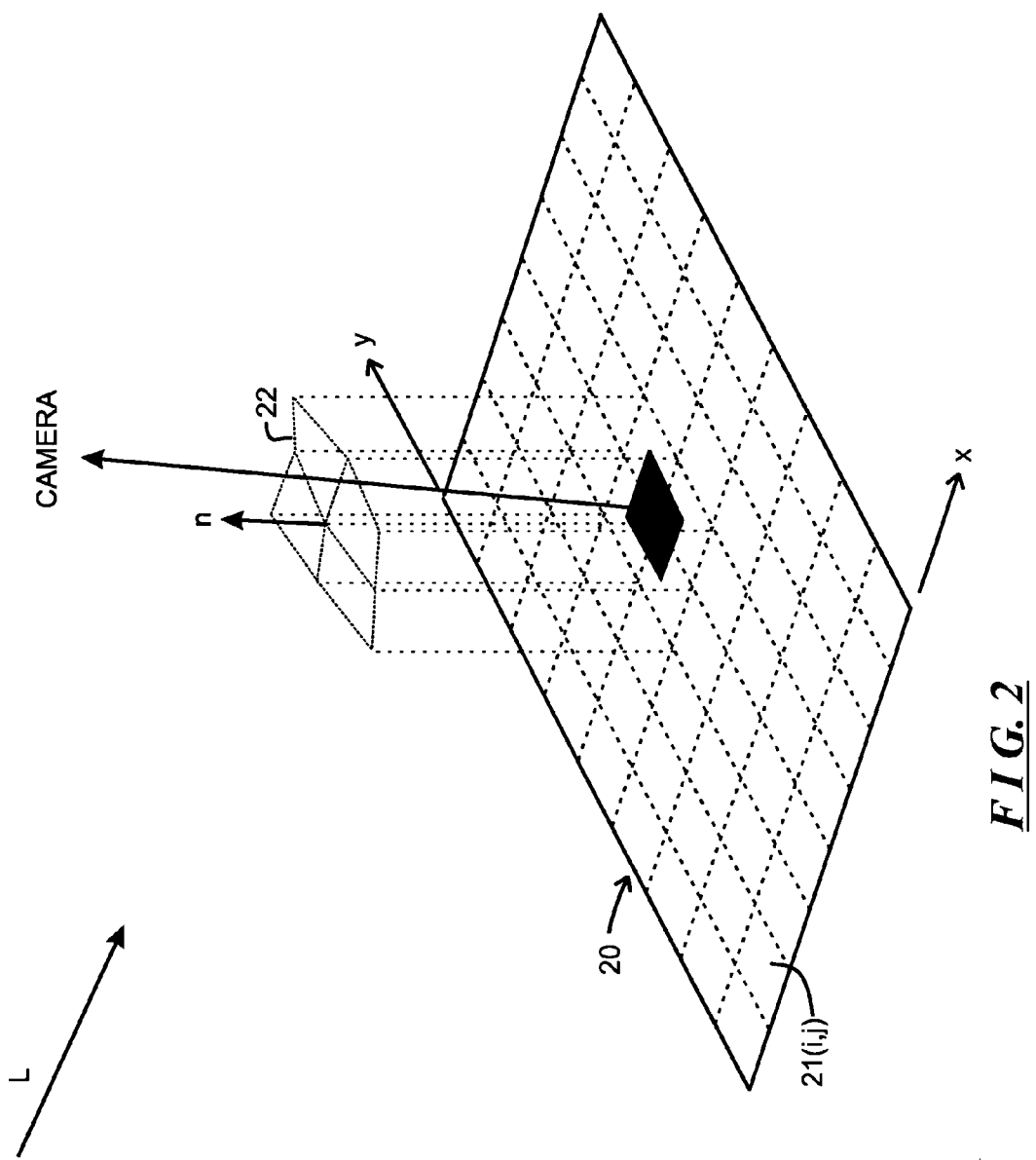
FIGS. 2 through 6 are diagrams that are useful in understanding the operations performed by the computer graphics system depicted in FIG. 1 in determining the updating of the model of an object by shading as applied to the two-dimensional image of the object in its given state of creation at any point in time.

The detailed operations performed by the computer graphics system 10 in determining the shape of an object will be described in connection with FIGS. 2 through 7. With reference to FIG. 2, in the operations of the computer graphics system 10, it is assumed that the image of the object is projected onto a two-dimensional image plane 20 that is tessellated into pixels 21(*i,j*) having a predetermined number of rows and columns. The image plane 20 defines an x,y Cartesian plane, with rows extending in the "x" direction and columns extending in the "y" direction. The projection of the surface of the object, which is identified in FIG. 2 by reference numeral 22, that is to be formed is orthographic, with the direction of the camera's "eye" being in the "z" direction, orthogonal to the x,y image plane. Each point on the image plane corresponds to a picture element, or "pixel," represented herein by $\oplus_{i,j}$, with i∈[1,N] and j∈[1,M], where "N" is the maximum number of columns (index "i" ranging over the columns in the image plane) and "M" is the maximum number of rows (index "j" ranging over the rows in the image plane). In the illustrative image plane 20 depicted in FIG. 2, the number of columns "N" is eight, and the number of rows "M" is nine. If the display device(s) 13 which are used to depict the image plane 20 to the operator are raster-scan devices, the rows may correspond to scan lines used by the device(s) to display the image. Each pixel $\oplus_{i,j}$ corresponds to a particular point $(x_i, y_j)$ of the coordinate system, and "M" by "N" identifies the resolution of the image. In addition, the computer graphics system 10 assumes that the object is illuminated by a light source having a direction $\vec{L} = (x_L, y_L, z_L)$ where "$\vec{L}$" is a vector, and that the surface of the object is Lambertian. The implicit camera, whose image plane is represented by the image plane 20, is assumed to be view the image plane 20 from a direction that is orthogonal to the image plane 20, as is represented by the arrow with the label "CAMERA."

As noted above, the computer graphics system 10 initializes the object with at least an infinitesimally small portion of the object to be modeled as the initial model. For each pixel $\oplus_{i,j}$, the height value z(x,y) defining the height of the portion of the object projected onto the pixel is known, and is defined as a height field H(x,y) as follows:

$$H(x,y) = \{z(x,y) : \forall(x,y) \in \Omega\} \quad (5),$$

where "∀(x,y)∈Ω" refers to "for all points (x,y) in the domain Ω," with the domain Ω referring to the image plane 20. Furthermore, for each pixel $\oplus_{i,j}$, the normal n(x,y) of the portion of the surface of the basic initial object projected thereon is also known and is defined as a normal field N(x,y) as follows:

$$N(x,y) = \{n(x,y) : \forall z(x,y) \in H(x,y)\} \quad (6).$$

In FIG. 2, the normal associated with the surface 22 of the object projected onto one the pixels of the image plane 20 is represented by the arrow labeled "n."

After the computer graphics system 10 displays the image representing the object defined by the initial model, which is displayed to the operator on the display 13 as the image on image plane 20, the operator can begin to modify it (that is, the image) by updating the shading the image using the pen 14 and digitizing tablet 15 (FIG. 1). It will be appreciated that the image of the initial model as displayed by the computer graphics system will itself be shaded to represent the shape of the object as defined by the initial model, as illuminated from the predetermined illumination direction and as projected onto the image plane. Each pixel $\oplus_{i,j}$ on the image plane will have an associated intensity value I(x,y) (which is also referred to herein as a "pixel value") which represents the relative brightness of the image at the pixel $\oplus_{i,j}$, and which, inversely, represents the relative shading of the pixel. If the initial pixel value for each pixel $\oplus_{i,j}$ is given by $I_0(x,y)$, which represents the image intensity value or brightness of the respective pixel $\oplus_{i,j}$ at location (x,y) on the image plane 20, and the pixel value after shading is represented by $I_1(x,y)$, then the operator preferably updates the shading for the image such that, for each pixel $$|I_1(x,y) - I_0(x,y)| < \epsilon_I \text{ for } (x,y) \in \Omega \quad (7),$$

where "$\epsilon_I$" ($\epsilon_I > 0$) is a predetermined bound value selected so that, if equation (7) is satisfied for each pixel, the shape of the object can be updated based on the shading provided by the operator.

After the operator updates the shading for a pixel, the computer graphics system 10 will perform two general operations in generation of the updated shape for the object. In particular, the computer graphics system 10 will (i) first determine, for each pixel $\oplus_{i,j}$ whose shading is updated, a respective new normal vector $n_1(x,y)$; and (ii) after generating an updated normal vector $n_1(x,y)$, determine a new height value z(x,y).

The computer graphics system 10 will perform these operations (i) and (ii) for each pixel $\oplus_{i,j}$ whose shading is updated, as the shading is updated, thereby to provide a new normal vector field N(x,y) and height field H(x,y). Operations performed by the computer graphics system 10 in connection with updating of the normal vector $n_1$ (item (i) above) for a pixel $\oplus_{i,j}$ will be described in connection with FIGS. 3 and 4, and operations performed in connection with updating of the height value z(x,y) (item (ii) above) for the pixel $\oplus_{i,j}$ will be described in connection with FIGS. 5 and 6.

Figure 3:
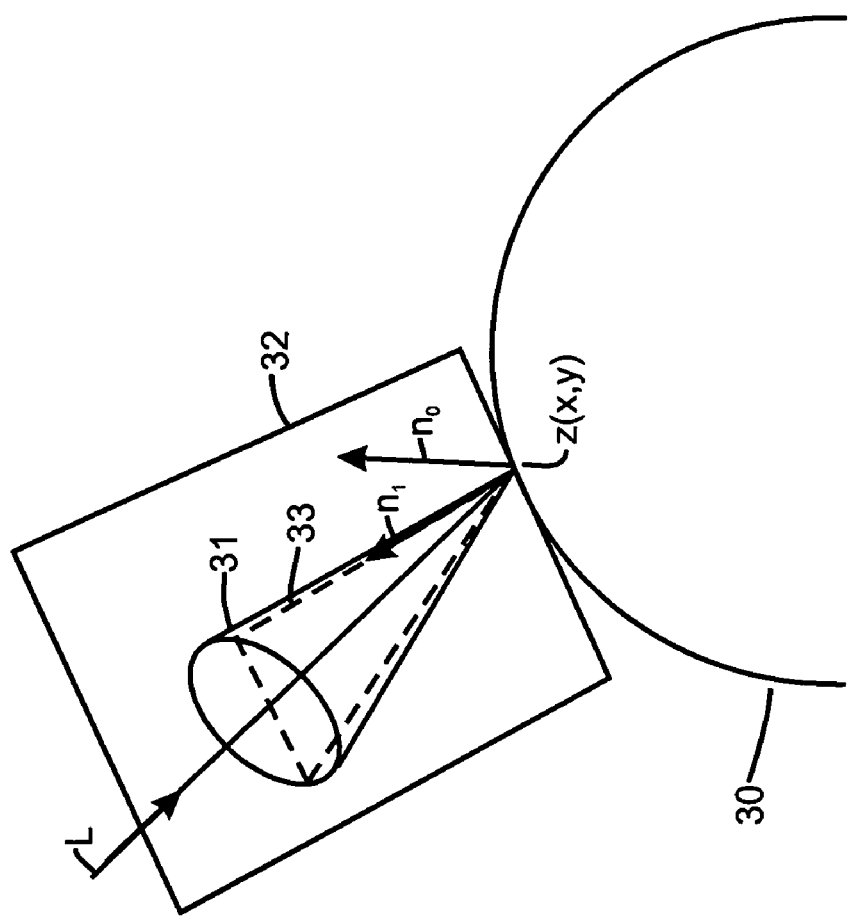

With reference initially to FIG. 3, that FIG. depicts a portion of the object, identified by reference numeral 30, after a pixel's shading has been updated by the operator. In the following, it will be assumed that the updated normal vector, identified by the arrow identified by legend "$n_1$," for a point z(x,y) on the surface of the object 30, is to be determined. The normal vector identified by legend "$n_0$," represents the normal to the surface prior to the updating. The illumination direction is represented by the line extending from the vector corresponding to the arrow identified by legend "L." "L" specifically represents an illumination vector whose direction is based on the direction of illumination from the light source illuminating the object, and whose magnitude represents the magnitude of the illumination on the object provided by the light source. In that case, based on the updating, the set of possible new normal vectors lie on the surface of the cone 31 which is defined by:

$$n_1 \cdot L = I \quad (8),$$

that is, the set of vectors for which the dot product with the illumination vector corresponds to the pixel value "I" for the pixel after the updating of the shading as provided by the operator. In addition, since the normal vector $n_1$ is, as is the case with all normal vectors, normalized to have a predetermined magnitude value, preferably the value "one," the updated normal vector has a magnitude corresponding to:

$$n_1 \cdot n_1 = \|n_1\| = 1 \quad (9),$$

where "$\|n_1\|$" refers to the magnitude of updated normal vector $n_1$.

Equations (8) and (9) define a set of vectors, and the magnitudes of the respective vectors, one of which is the updated normal vector for the updated object at point z(x,y). The computer graphics system 10 will select one of the vectors from the set as the appropriate updated normal vector $n_1$ as follows. As noted above, the updated normal vector will lie on the surface of cone 31. It is apparent that, if the original normal vector $n_0$ and the illumination vector L are not parallel, then they (that is, the prior normal vector $n_0$ and the illumination vector L) will define a plane. This follows since the point z(x,y) at which the illumination vector L impinges on the object 30, and the origin of the normal vector $n_0$ on object 30, is the same point, and the tail of the illumination vector and head of the prior normal vector $n_0$ will provide the two additional points which, with the point z(x,y), suffices to defined a plane. Thus, if a plane, which is identified by reference numeral 32, is constructed on which both the illumination vector L and the prior normal vector $n_0$ lie, that plane 32 will intersect the cone along two lines, which are represented by lines 33 in FIG. 3. One of the lines 33 lies on the surface of the cone 31 which is on the side of the illumination vector L towards the prior normal vector $n_0$, and the other line 33 lies on the surface of the cone 31 which is on the side of the illumination vector L away from the normal vector $n_0$, and the correct updated normal vector $n_1$ is defined by the line on the cone 31 which is on the side of the illumination vector L towards the prior normal vector $n_0$.

Based on these observations, the direction of the updated normal vector can be determined from equation (8) and the following. Since the prior normal vector $n_0$ and the illumination vector L form a plane 32, their cross product, "$n_0 \times L$" defines a vector that is normal to the plane 32. Thus, since the updated normal vector $n_1$ also lies in the plane 32, the dot product of the updated normal vector $n_1$ with the vector defined by the cross product between the prior normal vector $n_0$ and the illumination vector L has the value zero, that is, $$n_1 \cdot (n_0 \times L) = 0 \quad (10).$$

In addition, since the difference between the pixel values $I_0$ and $I_1$ provided by the prior shading and the updated shading is bounded $\epsilon_1$ (equation (7) above), the angle $\delta$ between the prior normal vector $n_0$ and the updated normal vector $n_1$ is also bounded by some maximum positive value $\epsilon_\delta$. As a result, equation (10) can be re-written as $$|(n_1, n_0 \times L)| < \epsilon_\delta \quad (11).$$

Figure 4:
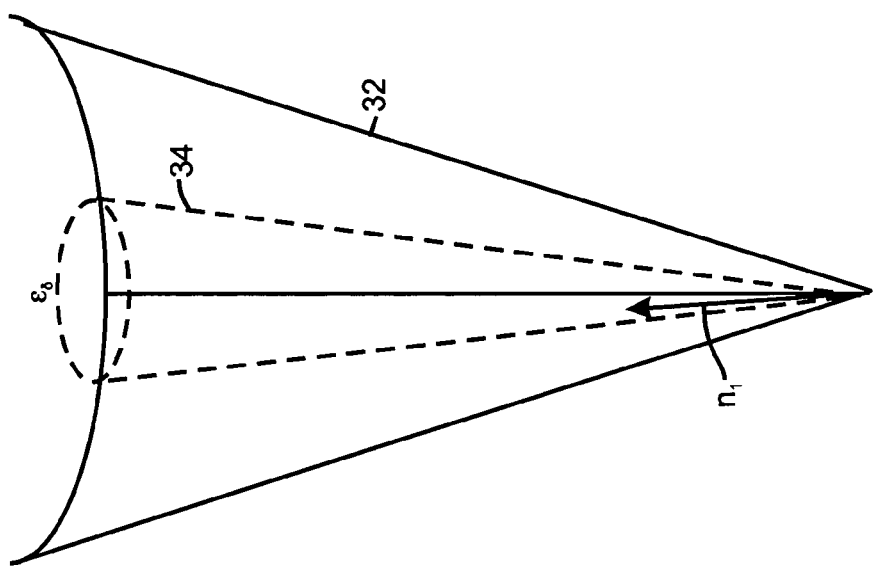

This is illustrated diagrammatically in FIG. 4. FIG. 4 depicts a portion of the cone 32 depicted in FIG. 3, the updated normal vector $n_1$, and a region, identified by reference numeral 34, that represents the maximum angle $\epsilon_\delta$ from the prior normal vector in which the updated normal vector $n_1$ is constrained to lie.

Figure 5:
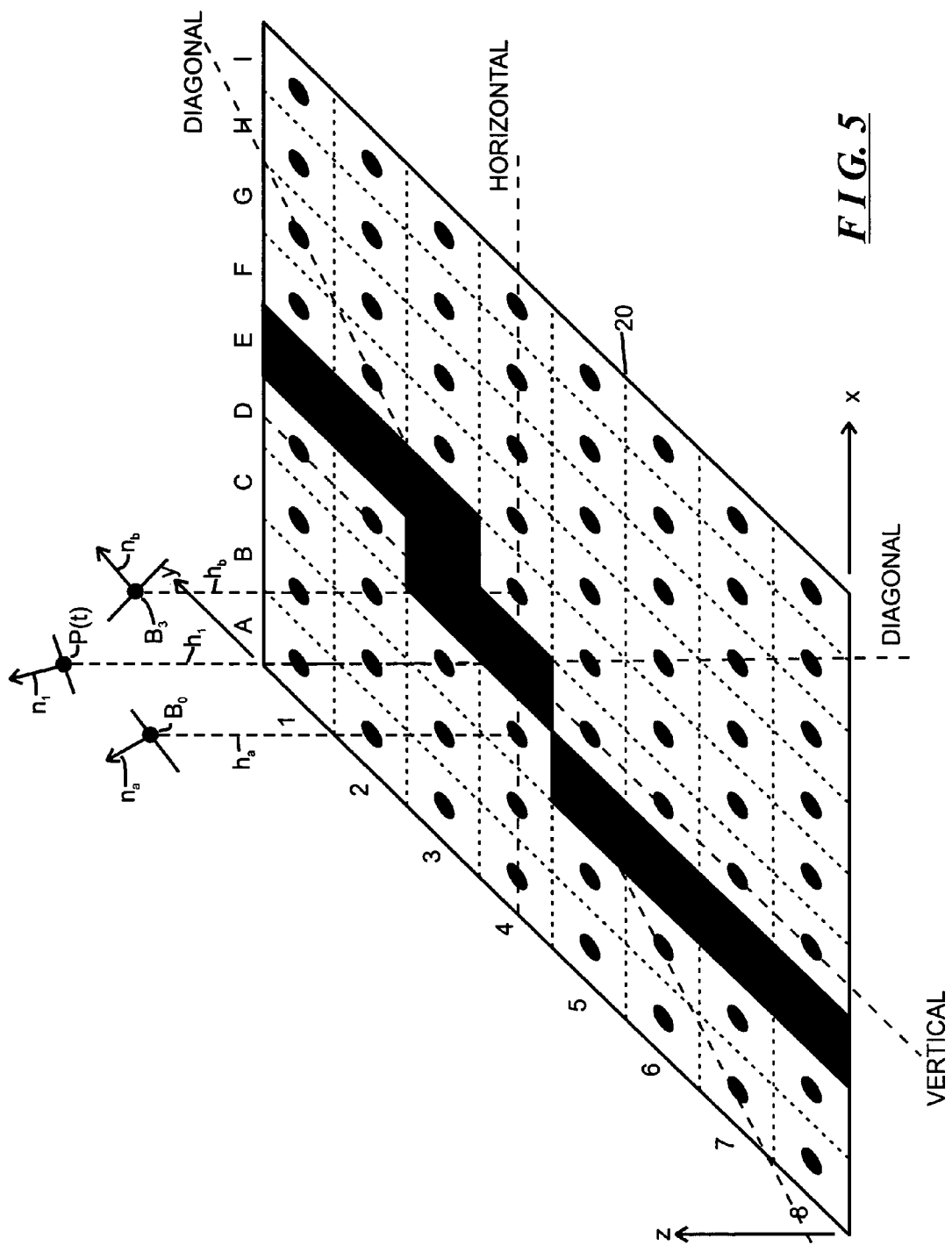

The computer graphics system 10 (FIG. 1) will generate an updated normal vector $n_1$ for each pixel $\oplus_{i,j}$ in the image plane 20 based on the shading provided by the operator, thereby to generate an updated vector field N(x,y). After the computer graphics system 10 has generated the updated normal vector for a pixel, it can generate a new height value z(x,y) for that pixel, thereby to update the height field H(x,y) based on the updated shading. Operations performed by the computer graphics system 10 in connection with updating the height value z(x,y) will be described in connection with FIGS. 5 and 6. FIG. 5 depicts an illustrative updated shading for the image plane 20 depicted in FIG. 2. For the image plane 20 depicted in FIG. 5, the pixels $\oplus_{i,j}$ have been provided with coordinates, with the rows being identified by numbers in the range from 1 through 8, inclusive, and the columns being identified by letters in the range A through I inclusive. As shown in FIG. 5, in the updated shading, the pixels $\oplus_{E,1}$ through $\oplus_{E,3}$, $\oplus_{D,3}$ through $\oplus_{D,4}$ and $\oplus_{C,5}$ through $\oplus_{C,8}$ have all been modified, and the computer graphics system 10 is to generate an updated height value h(x,y) therefor for use as the updated height value for the pixel in the updated height field H(x,y). To accomplish that, the computer graphics system 10 performs several operations, which will be described below, to generate a height value for each pixel $\oplus_{i,j}$ whose shading has been modified along a vertical direction, a horizontal direction, and two diagonal directions, and generates the final height value for the pixel as the average of the four height values (that is, the height values along the vertical, horizontal, and two diagonal directions).

The operations performed by the computer graphics system 10 in generating an updated height value will be described in connection with one of the modified pixels in the image plane 20, namely, pixel $\oplus_{D,4}$, along one of the directions, namely, the horizontal direction. Operations performed in connection with the other directions, and the other pixels whose shading is updated, will be apparent to those skilled in the art. In generating an updated height value, the computer graphics system 10 makes use of Bézier-Bernstein interpolation, which defines a curve P(t) of degree "n" as $$P(t) = \sum_{i=0}^{n} B_i \binom{n}{i} t^i (1-t)^{n-i}, \quad (12)$$

where "t" is a numerical parameter on the interval between "zero" and "one," inclusive, and vectors $B_i$ (defined by components ($b_{ix}, b_{iy}, b_{iz}$)) define "n+1" control points for the curve P(t), with control points $B_0$ and $B_n$ comprising the endpoints of the curve. The tangents of the curve P(t) at the endpoints correspond to the vectors $B_0B_1$ and $B_{n-1}B_n$. In one embodiment, the computer graphics system 10 uses a cubic Bézier-Bernstein interpolation $$P_{n=3}(t) = B_0(1-t)^3 + 3B_1 t(1-t)^2 + 3B_2 t^2(1-t) + B_3 t^3 \qquad (13)$$

to generate the updated height value. The points $B_0$, $B_1$, $B_2$, and $B_3$ are control points for the cubic curve $P_{n=3}(t)$.

Equation (13), as applied to the determination of the updated height value $h_1$ for the pixel $\oplus_{D,4}$ corresponds to $$h_1 = h_a(1-t)^3 + 3B_1 t(1-t)^2 + 3B_2 t^2(1-t) + h_b t^3 \qquad (14).$$

It will be appreciated from equation (14) that, for "t" equal to "zero," the updated height value $h_1$ for pixel $\oplus_{D,4}$ corresponds to $h_a$, which is the height value for pixel $\oplus_{C,4}$, and for "t" equal to "one," the updated height value $h_1$ for pixel $\oplus_{D,4}$ corresponds to $h_b$, which is the height value for pixel $\oplus_{E,4}$. On the other hand, for "t" having a value other than zero or one, the updated height value $h_1$ is a function of the height values $h_a$ and $h_b$ of the pixels $\oplus_{C,4}$ and $\oplus_{E,4}$ and the height values for control points $B_1$ and $B_2$.

As noted above, for an "n" degree curve P(t), the tangents at the endpoints $B_0$ and $B_1$ correspond to the vectors $B_0B_1$ and $B_{n-1}B_n$. Thus, for the curve $P_{n=3}(t)$ shown in FIG. 6, the vector $B_1B_0$ that is defined by endpoint $B_0$ and adjacent control point $B_1$ is tangent to the curve $P_{n=3}(t)$ at endpoint $B_0$ and the vector $B_2B_3$ defined by endpoint $B_3$ and adjacent control point $B_2$ is tangent to the curve at endpoint $B_3$. Accordingly, the vector $B_1B_0$ is orthogonal to the normal vector $n_a$ at pixel $\oplus_{C,4}$ and the vector $B_2B_3$ is orthogonal to the normal vector $n_b$ at pixel $\oplus_{E,4}$. Thus, $$0 = (B_1 - B_0) \cdot n_a \text{ and } 0 = (B_2 - B_3) \cdot n_b \qquad (15),$$

which leads to $$0 = (B_1 - h_a) \cdot n_a \text{ and } 0 = (B_2 - h_b) \cdot n_b \qquad (16).$$

For the determination of the updated height value $h_1$ for the horizontal direction (see FIG. 5), the equation (14), which is in vector form, gives rise to the following equations for each of the dimensions "x" and "z" (the "z" dimension being orthogonal to the image plane):

$$h_{1x} = h_{ax}(1-t)^3 + 3b_{1x} t(1-t)^2 + 3b_{2x} t^2(1-t) + h_{bx} t^3 \qquad (17)$$

and $$h_{1z} = h_{az}(1-t)^3 + 3b_{1z} t(1-t)^2 + 3b_{2z} t^2(1-t) + h_{bz} t^3 \qquad (18),$$

where the "x" and "z" subscripts in equations (17) and (18) indicate the respective "x" and "z" components for the respective vectors in equation (14). It will be appreciated that, for equations (17) and (18), only value of the "z" component, $h_{1z}$, of the height value is unknown; the value of the "x" component, $h_{1x}$, will be a function of the position of the pixel whose height value is being determined, in this case pixel $\oplus_{D,4}$. In addition, equation (16) gives rise to the following two equations $$0 = (b_{1x} - h_{bx}) n_{bx} + (b_{1y} - h_{by}) n_{by} + (b_{1z} - h_{bz}) n_{bz} \qquad (19),$$

and $$0 = (b_{2x} - h_{bx}) n_{bx} + (b_{2y} - h_{by}) n_{by} + (b_{2z} - h_{bz}) n_{bz} \qquad (20),$$

where subscripts "x," "y" and "z" in equations (19) and (20) indicate the respective "x," "y" and "z" components for the respective vectors in equation (16).

Figure 6:
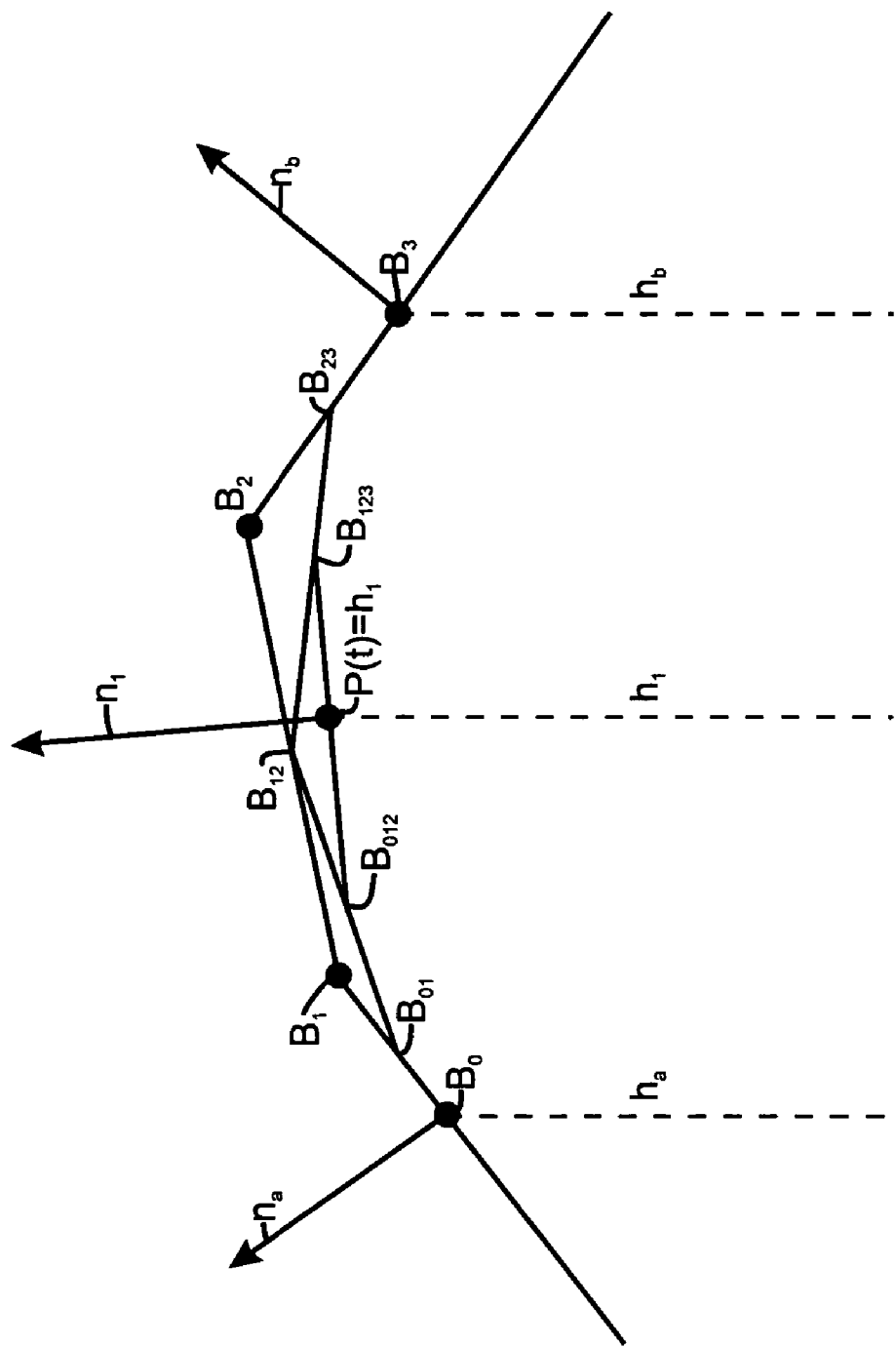

In addition, as noted above, there is the further constraint on the curve $P_{n=3}(t)$, in particular the constraint that the updated normal $n_1$ be normal to the curve at the point corresponding to pixel $\oplus_{D,4}$. If the vector $B_{012}B_{123}$ in FIG. 6 is tangent to the curve at the point corresponding to pixel $\oplus_{D,4}$, then the point $h_1$, whose "z" component corresponds to the updated height value, also lies on the vector $B_{012}B_{123}$. Thus, $$0 = (B_{012} - h_1) \cdot n_1 \qquad (21),$$

and $$0 = (B_{123} - h_1) \cdot n_1 \qquad (22).$$

Based on the convex combination depicted in FIG. 6, $$\begin{aligned} B_{012} &= B_{01} + t(B_{12} - B_{01}) \\ &= B_{01}(1-t) + B_{12} t \end{aligned} \qquad (23)$$

and $$\begin{aligned} B_{123} &= B_{12} + t(B_{23} - B_{12}), \\ &= B_{12}(1-t) + B_{23} t \end{aligned} \qquad (24)$$

which lead to $$B_{012} = B_0 + t(B_1 - B_0) + t[B_1 + t(B_2 - B_1) - B_0 - t(B_1 - B_0)] \qquad (25)$$

and $$B_{123} = B_1 + t(B_2 - B_1) + t[B_2 + t(B_3 - B_2) - B_1 - t(B_2 - B_1)] \qquad (26)$$

Combining equations (21), (23) and (25)

$$\begin{aligned} 0 &= (B_{01}(1-t) + B_{12} t - h_1) \cdot n_1 \\ &= (B_0(1-t)^2 + 2B_1 t(1-t) + B_2 t^2 - h_a) \cdot n_1 \end{aligned} \qquad (27)$$

which leads to $$0 = (b_{0x}(1-t)^2 + 2b_{1x} t(1-t) + b_{2x} t^2 - h_{1x}) n_{1x} \text{ and}$$

$$0 = (b_{0z}(1-t)^2 + 2b_{1z} t(1-t) + b_{2z} t^2 - h_{1z}) n_{1z} \qquad (28)$$

for the "x" and "z" components of the respective vectors. Similarly, for equations (22), (24) and (26), $$0 = (b_{1x}(1-t)^2 + 2b_{2x} t(1-t) + b_{3x} t^2 - h_{1x}) n_{1x} \text{ and}$$

$$0 = (b_{1z}(1-t)^2 + 2b_{2z} t(1-t) + b_{3z} t^2 - h_{1z}) n_{1z} \qquad (29)$$

for the "x" and "z" components of the respective vectors.

It will be appreciated that the eight equations (17) through (20), (28) and (29) are all one-dimensional in the respective "x" and "z" components. For the equations (17) through (20), (28) and (29), there are six unknown values, namely, the value of parameter t, the values of the "x" and "z" components of the vector $B_1$ (that is, values $b_{1x}$ and $b_{1z}$), the "x" and "z" components of the vector $B_2$ (that is, values $b_{2x}$ and $b_{2z}$), and the "z" component of the vector $h_1$ (that is, value $h_{1z}$) to the point $P_{n=3}(t)$ for the pixel $\oplus_{D,4}$. The eight equations (17) through (20), (28) and (29) are sufficient to define a system of equations which will suffice to allow the values for the unknowns to be determined by methodologies which will be apparent to those skilled in the art.

The computer graphics system 10 will, in addition to performing the operations described above in connection with the horizontal direction (corresponding to the "x" coordinate axis), also perform corresponding operations similar to those described above for each of the vertical and two diagonal directions to determine the updated height vector $h_1$ for the pixel $\oplus_{D,4}$. After the computer graphics system 10 determines the updated height vectors for all four directions, it will average them together. The "z" component of the average of the updated height vectors corresponds to the height value for the updated model for the object.

Figure 7:
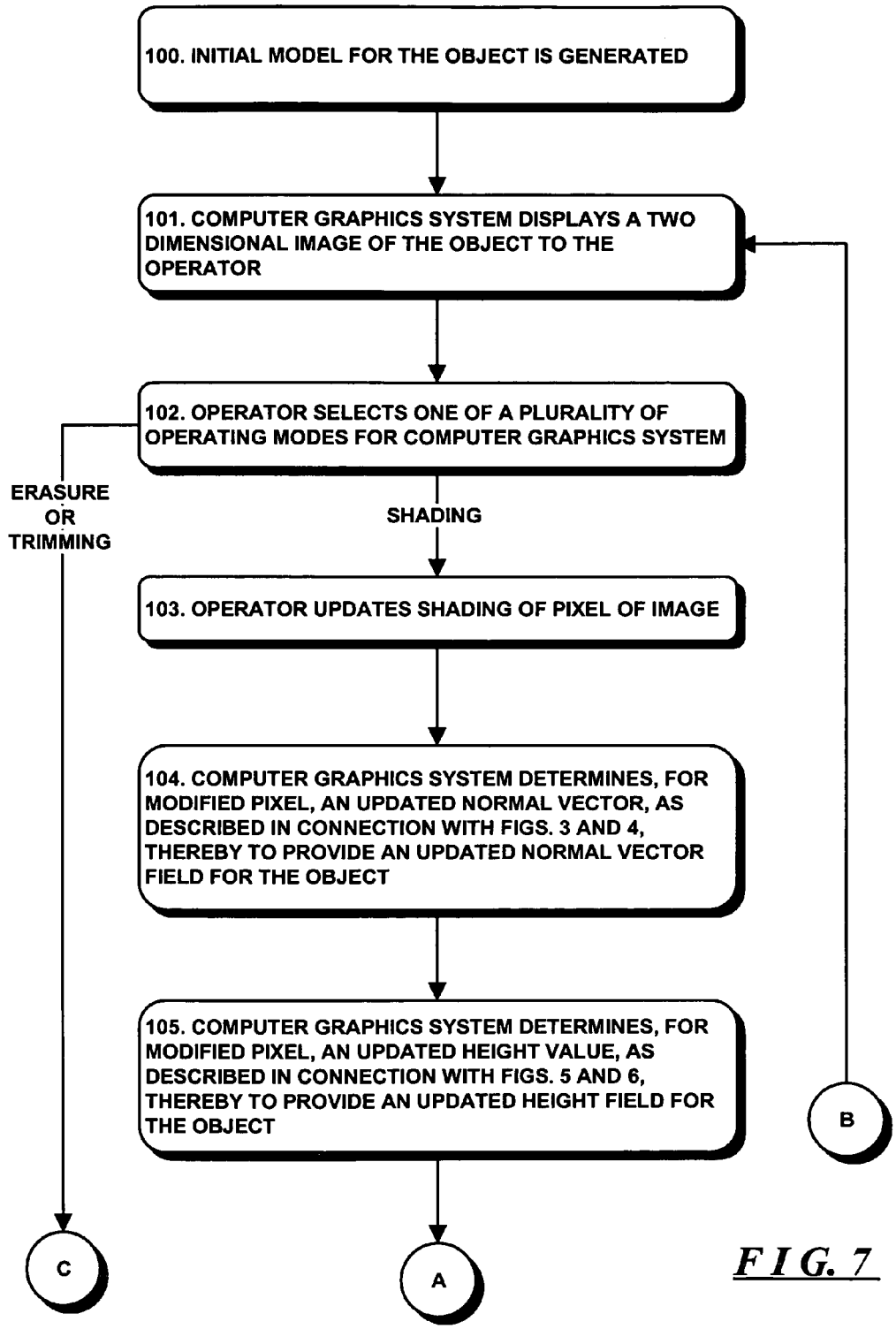
FIG. 7 is a flow-chart depicting operations performed by the computer graphics system and operator in connection with the invention.
Figure 7A:
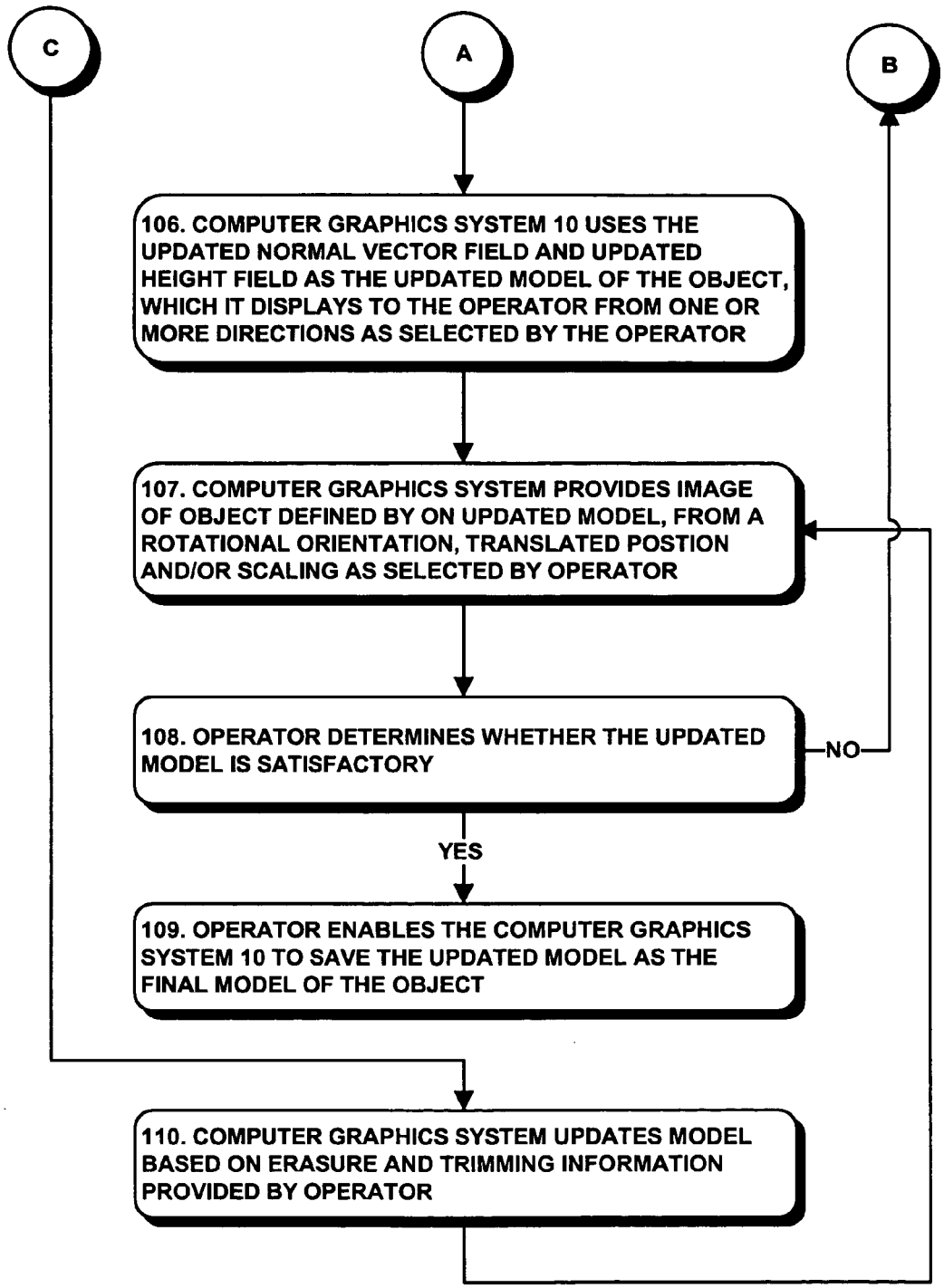

The operations performed by the computer graphics system 10 will be described in connection with the flowchart in FIG. 7. Generally, it is anticipated that the operator will have a mental image of the object that is to be modeled by the computer graphics system. With reference to FIG. 7, the initial model for the object is determined (step 100), and the computer graphics system displays a two dimensional image thereof to the operator based on a predetermined illumination direction, with the display direction corresponding to an image plane (reference image plane 20 depicted in FIG. 2) (step 101). As noted above, the initial model may define a predetermined default shape, such as a hemi-sphere or -ellipsoid, provided by the computer graphics system, or alternatively a shape as provided by the operator. In any case, the shape will define an initial normal vector field N(x,y) and height field H(x,y), defining a normal vector and height value for each pixel in the image. After the computer graphics system 10 has displayed initial model, the operator can select one of a plurality of operating modes, including a shading mode in connection with the invention, as well as one of a plurality of conventional computer graphics modes, such as erasure and trimming (step 102). If the operator selects the shading mode, the operator will update the shading of the two-dimensional image by means of, for example, the system's pen and digitizing tablet (step 103). While the operator is applying shading to the image in step 103, the computer graphics system 10 can display the shading to the operator. The shading that is applied by the operator will preferably be a representation of the shading of the finished object as it would appear illuminated from the predetermined illumination direction, and as projected onto the image plane as displayed by the computer graphics system 10.

When the operator has updated the shading for a pixel in step 103, the computer graphics system 10 will generate an update to the model of the object. In generating the updated model, the computer graphics system 10 will first determine, for each pixel in the image, an updated normal vector, as described above in connection with FIGS. 3 and 4, thereby to provide an updated normal vector field for the object (step 104). Thereafter, the computer graphics system 10 will determine, for each pixel in the image, an updated height value, as described above in connection with FIGS. 5 and 6, thereby to provide an updated height field for the object (step 105).

After generating the updated normal vector field and updated height field, thereby to provide an updated model of the object the computer graphics system 10, will display an image of the updated model to the operator from one or more directions and zooms as selected by the operator (step 106), in the process rotating, translating and scaling and/or zooming the image as selected by the operator (step 107). If the operator determines that the updated model is satisfactory (step 108), which may occur if, for example, the updated model corresponds to his or her mental image of the object to be modeled, he or she can enable the computer graphics system 10 to save the updated model as the final model of the object (step 109). On the other hand, if the operator determines in step 107 that the updated model is not satisfactory, he or she can enable the computer graphics system 10 to return to step 101.

Returning to step 102, if the operator in that step selects another operating mode, such as the erasure mode or a conventional operational mode such as the trimming mode, the computer graphics system will sequence to step 110 to update the model based on the erasure information, or the trimming and other conventional computer graphic information provided to the computer graphics system 10 by the operator. The computer graphics system will sequence to step 107 to display an image of the object based on the updated model. If the operator determines that the updated model is satisfactory (step 108), he or she can enable the computer graphics system 10 to save the updated model as the final model of the object (step 109). On the other hand, if the operator determines in step 107 that the updated model is not satisfactory, he or she can enable the computer graphics system 10 to return to step 101.

The operator can enable the computer graphics system 10 to perform steps 101, 103 through 107 and 110 as the operator updates the shading of the image of the object (step 103), or provides other computer graphic information (step 110), and the computer graphics system 10 will generate, in steps 104 and 105, the updated normal vector field and updated height field, or, in step 110, conventional computer graphic components, thereby to define the updated model of the object. When the operator determines in step 108 that the updated model corresponds to his or her mental image of the object, or is otherwise satisfactory, he or she can enable the computer graphics system 10 to store the updated normal vector field and the updated height field to define the final model for the object (step 109).

The invention provides a number of advantages. In particular, it provides an interactive computer graphics system which allows an operator, such as an artist, to imagine the desired shape of an object and how the shading on the object might appear with the object being illuminated from a particular illumination direction and as viewed from a particular viewing direction (as defined by the location of the image plane). After the operator has provided some shading input corresponding to the desired shape, the computer graphics system displays a model of the object, as updated based on the shading, to the operator. The operator can accept the model as the final object, or alternatively can update the shading further, from which the computer graphics system will further update the model of the object. The computer graphics system constructed in accordance with the invention avoids the necessity of solving partial differential equations, which is required in prior art systems which operate in accordance with the shape-from-shading methodology.

A further advantage of the invention is that it readily facilitates the use of a hierarchical representation for the model of the object that is generated. Thus, if, for example, the operator enables the computer graphics system 10 to increase the scale of the object or zoom in on the object thereby to provide a higher resolution, it will be appreciated that a plurality of pixels of the image will display a portion of the image which, at the lower resolution, were associated with a single pixel. In that case, if the operator updates the shading of the image at the higher resolution, the computer graphics system will generate the normal vector and height value for each pixel at the higher resolution for which the shading is updated as described above, thereby to generate and/or update the portion of the model associated with the updated shading at the increased resolution. The updated portion of the model at the higher resolution will be associated with the particular portion of the model which was previously defined at the lower resolution, thereby to provide the hierarchical representation, which may be stored. Thus, the object as defined by the model inherits a level of detail which corresponds to a higher resolution in the underlying surface representation. Corresponding operations can be performed if the operator enables the computer graphics system 10 to decrease the scale of the object or zoom out from the object, thereby providing a lower resolution.

It will be appreciated that a number of variations and modifications may be made to the computer graphics system 10 as described above in connection with FIGS. 1 through 7. For example, the computer graphics system 10 can retain the object model information, that is, the normal vector field information and height field information, for a number of updates of the shading as provided by the operator, which it (that is, system 10) may use in displaying models of the object for the respective updates. This can allow the operator to view images of the respective models to, for example, enable him or her to see the evolution of the object through the respective updates. In addition, this can allow the operator to return to a model from a prior update as the base which is to be updated. This will allow the operator to, for example, generate a tree of objects based on different shadings at particular models.

In addition. although the computer graphics system 10 has been described as making use of Bézier-Bernstein interpolation to determine the updated height field h(x,y), it will be appreciated that other forms of interpolation, such as Taylor polynomials and B-splines, may be used. In addition, multiple forms of surface representations may be used with the invention. Indeed, since the model generation methodology used by the computer graphics system 10 is of general applicability, all free-form surface representations as well as piecewise linear surfaces consisting of, for example, triangles, quadrilaterals and/or pentagons can be used.

Furthermore, although the computer graphics system 10 has been described as making use of an orthogonal projection and a single light source, it will be appreciated that the other forms of projection, including perspective projection, and multiple light sources can be used.

In addition, although the computer graphics system 10 has been described as providing shape of an object by shading of an image of the object, it will be appreciated that it may also provide computer graphics operations, such as trimming and erasure, through appropriate operational modes of the pen 14 and digitizing tablet.

Furthermore, although the computer graphics system has been described as generating a model of an object on the assumption that the object's surface is Lambertian, it will be appreciated that other surface treatments may be used for the object when an image of the object is rendered.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A computer graphics system for generating a geometrical model representing geometry of at least a portion of a surface of a corresponding three-dimensional object from shape information provided by an operator in connection with a two-dimensional image of the object, the image representing the object as projected onto an image plane, the computer graphics system comprising:
   A. an operator input device configured to receive shape information provided by the operator in connection with a selected portion of the two-dimensional image;
   B. a model generator configured to receive the shape information from the operator input device, the shape information including shading information, the shading information representing a change in brightness level of the selected portion of the image, the shading information creating a two-dimensional representation of a three-dimensional change of shape of the corresponding three-dimensional object in the selected portion of the image, and to generate in response thereto an updated three-dimensional geometrical model of the corresponding three-dimensional object, the model generator being configured to use the shading information to determine at least one geometrical feature of the updated geometrical model, the updated three-dimensional geometrical model of the corresponding three-dimensional object including a three-dimensional change of shape corresponding to the two-dimensional representation of the three-dimensional change of shape in the selected portion of the image; and
   C. an object display configured to display the image of the object as defined by the updated geometrical model.

2. A computer graphics system as defined in claim 1 in which the operator input device is further configured to receive predetermined indicia provided by the operator for a portion of the image, and, in response to the operator using the operator input device to provide predetermined indicia for a portion of the image, the model generator generates the updated geometrical model by marking the portion of the model associated with the portion of the image, the object display being configured to display the image of the object without the marked portion of the model thereby effectively erasing the portion of the object associated with the marked portion.

3. A computer graphics system as defined in claim 2 in which the image comprises a plurality of pixels, the operator input device being configured to receive the predetermined indicia provided by the operator for at least one pixel.

4. A computer graphics system as defined in claim 1 in which the shape information further includes trimming information, the trimming information defining a curve on the two-dimensional image, the model generator being configured to generate the updated geometrical model by projecting the curve from the image onto the object.

5. A computer graphics system as defined in claim 4 in which the operator input device includes a pen and digitizing tablet, the pen and digitizing tablet being configured to facilitate the operator defining the curve.

6. A computer implemented graphics method for generating a geometrical model representing geometry of at least a portion of a surface of a three-dimensional object from shape information provided by an operator in connection with a two-dimensional image of the object, the image representing the object as projected onto an image plane, the method comprising:

A. receiving shape information provided by the operator in connection with a selected portion of the image of the corresponding three-dimensional object, the shape information including shading information, the shading information representing a change in brightness level of the selected portion of the image, the shading information creating a two-dimensional representation of a three-dimensional change of shape of the corresponding three-dimensional object in the selected portion of the image;
  B. generating in response to the shape information an updated three-dimensional geometrical model of the three-dimensional object, the shape information being used to determine at least one geometrical feature of the updated geometrical model, the updated three-dimensional geometrical model of the corresponding three-dimensional object including a three-dimensional change of shape corresponding to the two-dimensional representation of the three-dimensional change of shave in the selected portion of the image;
  C. displaying the image of the object as defined by the updated geometrical model.

7. A method as defined in claim 6 further comprising:
receiving predetermined indicia provided by the operator for a portion of the image, and in which, in response to receiving predetermined indicia for a portion of the image, the model generating includes generating the updated geometrical model by marking the portion of the model associated with the portion of the image, the object display being configured to display the image of the object without the marked portion of the model thereby effectively erasing the portion of the object associated with the marked portion.

8. A method as defined in claim 7 in which the image comprises a plurality of pixels, and the receiving of predetermined indicia including receiving predetermined indicia for at least one pixel.

9. A method as defined in claim 6 in which the shape information further includes trimming information, the trimming information defining a curve on the two-dimensional image, the model generating including generating the updated geometrical model by projecting the curve from the image onto the object.

10. A method as defined in claim 9 in which the receiving of shape information includes receiving information defining the curve from an operator input device.

11. A method as defined in claim 10 in which the receiving of information includes receiving the information from a pen and digitizing tablet.

12. A computer program product for use in connection with a computer to provide a computer graphics system for generating a geometrical model representing geometry of at least a portion of a surface of a corresponding three-dimensional object from shape information provided by an operator in connection with a two-dimensional image of the object, the image representing the object as projected onto an image plane, the computer program product comprising a computer readable medium having encoded thereon:

A. an operator input module configured to enable the computer to receive shape information provided by the operator in connection with a selected portion of the two-dimensional image;
  B. a model generator module configured to enable the computer to receive the shape information from the operator input device, the shape information includes shading information, the shading information representing a change in brightness level of the selected portion of the image, the shading information creating a two-dimensional representation of a three-dimensional change of shape of the corresponding three-dimensional object in the selected portion of the image, and to generate in response thereto an updated three-dimensional geometrical model of the three-dimensional object, the model generator module being configured to enable the computer to use the shading information to determine at least one geometrical feature of the updated geometrical model, the updated three-dimensional geometrical model of the corresponding three-dimensional object including a three-dimensional change of shape corresponding to the two-dimensional representation of the three-dimensional change of shape in the selected portion of the image; and
  C. an object display module configured to enable the computer to display the image of the object as defined by the updated geometrical model.

13. A computer program product as defined in claim 12 in which the operator input module is further configured to receive predetermined indicia provided by the operator, and the model generator module is further configured to enable the computer to, in response to the model input module receiving predetermined indicia for a portion of the image, generate the updated geometrical model by marking the portion of the model associated with the portion of the image, the object display module being configured to enable the computer to display the image of the object without the marked portion of the model thereby effectively erasing the portion of the object associated with the marked portion.

14. A computer program product as defined in claim 13 in which the image comprises a plurality of pixels, the operator input module being further configured to enable the computer to receive the predetermined indicia for at least one pixel.

15. A computer program product as defined in claim 12 in which the shape information further includes trimming information, the trimming information defining a curve on the two-dimensional image, the model generator module being configured to enable the computer to generate the updated geometrical model by projecting the curve from the image onto the object.

16. A computer program product as defined in claim 15 in which the operator input module is further configured to enable the computer to receive trimming information from a pen and digitizing tablet.

* * * * *